United States Patent [19]

Reidelbach et al.

[11] 4,201,418
[45] May 6, 1980

[54] ANCHORING ARRANGEMENT OF AN END- OR DEFLECTION-POINT OF A SAFETY BELT, ESPECIALLY IN MOTOR VEHICLES

[75] Inventors: Willi Reidelbach; Walter Schmid, both of Sindelfingen, Fed. Rep. of Germany

[73] Assignee: Daimler-Benz Aktiengesellschaft, Fed. Rep. of Germany

[21] Appl. No.: 915,137

[22] Filed: Jun. 13, 1978

[30] Foreign Application Priority Data

Jun. 16, 1977 [DE] Fed. Rep. of Germany ....... 2727123

[51] Int. Cl.$^2$ .................... A62B 35/00; A47C 31/00
[52] U.S. Cl. .................................. 297/474; 280/805; 297/471
[58] Field of Search ............... 280/744, 745, 747, 746; 242/107.4 R; 244/122 B; 297/385, 388, 389, 471, 474

[56] References Cited

U.S. PATENT DOCUMENTS

| | | | |
|---|---|---|---|
| 2,708,966 | 5/1955 | Davis | 244/122 B |
| 2,891,804 | 6/1959 | Frayne et al. | 297/389 X |
| 3,329,464 | 7/1967 | Barwood et al. | 244/122 B |
| 3,879,054 | 4/1975 | Lindblad | 280/747 |

FOREIGN PATENT DOCUMENTS

| | | | |
|---|---|---|---|
| 2330635 | 1/1974 | Fed. Rep. of Germany | 297/385 |
| 2423777 | 11/1975 | Fed. Rep. of Germany | 297/385 |
| 2431249 | 1/1976 | Fed. Rep. of Germany | 297/385 |
| 2457184 | 6/1976 | Fed. Rep. of Germany | 297/385 |

Primary Examiner—James T. McCall
Attorney, Agent, or Firm—Craig and Antonelli

[57] ABSTRACT

An anchoring arrangement of an end point or deflection point of a safety belt, especially in motor vehicles, under interposition of a spring at a fixed vehicle part; the spring is installed prestressed in the sense of a tightening of the belt band and is blocked in the normal driving operation in this position while the blocking is released by a force peak exceeding the prestress force of the spring which occurs at the beginning of an accident at the belt band.

19 Claims, 4 Drawing Figures

ANCHORING ARRANGEMENT OF AN END- OR DEFLECTION-POINT OF A SAFETY BELT, ESPECIALLY IN MOTOR VEHICLES

The present invention relates to an anchoring arrangement of an end point or deflection point of a safety belt, especially in motor vehicles, at a fixed structural part fixed relative to the vehicle under interconnection of a spring.

Such an anchoring of a safety belt for the passengers of vehicles is disclosed already in the U.S. Pat. No. 2,891,804. Such a belt anchoring arrangement is capable to absorb oscillating-like, very brief acceleration changes which would otherwise lead to additional stresses or loads of the belt bands and of the buckled passengers. However, these arrangements would not be suitable to eliminate a so-called belt looseness, present nearly always, which at the same time leads to increased loads for passengers and belt band.

The present invention is therefore concerned with the task to eliminate this disadvantage and to so further develop a belt anchoring arrangement of the type described hereinabove that a tightening of the belt band also takes place above a predetermined tensional or pulling force acting on the belt band.

The underlying problems are solved according to the present invention in that the spring is installed prestressed in the sense of a tightening of the belt band and is blocked in this position in the normal driving operation, and in that the blocking is released by a force peak which occurs at the belt band at the beginning of an accident and which exceeds the prestress force of the spring.

A preferred embodiment of the present invention provides that an eye cooperating with the belt band is displaceably guided in a fitting fixed relative to the vehicle, whereby the fitting has a bent-off free end which during normal operation lockingly engages into a recess of the eye, and in that one or several cup or coil springs or the like are supported directly or indirectly both at the fitting as also at the eye.

In a particularly advantageous manner the mutual locking is thereby so constructed that both the recess as also the end of the fitting engaging into this recess have bevelled surfaces cooperating in the sense of a reduction of the disengaging force.

A further advantageous embodiment of the present invention provides that a rod-spring or leaf spring extending transversely to the tensional direction of the belt band is supported at two points in the tensioning direction on a fitting fixed at the vehicle and in that between these support points an eye cooperating with the belt band is force-lockingly or form-lockingly connected with the spring, and in that a further support point blocking the spring during normal operation opposite the tensioning direction of the belt band is provided on the side of the spring opposite the two first support points approximately centrally between the same.

The third support point may thereby be constructed preferably as spring-loaded bolt which is retained in the normal operation by frictional engagement with the spring or with the eye surrounding the same.

Accordingly, it is an object of the present invention to provide an anchoring arrangement of an end point or deflection point of a safety belt, especially in motor vehicles, which avoids by extremely simple means the shortcomings and drawbacks encountered in the prior art.

Another object of the present invention resides in an anchoring arrangement of an end point or deflection point of a safety belt which is capable to eliminate an almost always present belt looseness that leads to increased loads for the passengers and belt band.

A further object of the present invention resides in an anchoring arrangement of the end point or deflection point of a safety belt, especially in motor vehicles, which is so constructed that above a predetermined tensional force acting on the belt band also a tightening of the belt band takes place automatically.

A still further object of the present invention resides in an anchoring arrangement of the type described above which further increases the safety for the passengers of the vehicle without increase in discomfort during normal driving operation.

Still another object of the present invention resides in an anchoring arrangement for the deflection point or end point of a safety belt in motor vehicles which is simple in construction, easy to install and low in cost, yet is highly reliable in operation for its intended purposes.

These and other objects, features and advantages of the present invention will become more apparent from the following description when taken in connection with the accompanying drawing which shows, for purposes of illustration only, two embodiments in accordance with the pressent invention, and wherein.

Figure 1:
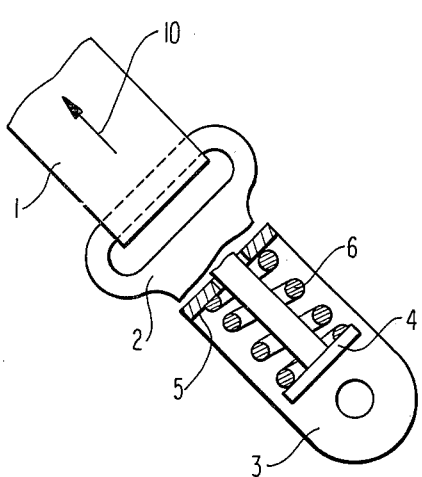
FIG. 1 is a plan view, partly in cross section, on an anchoring arrangement in accordance with the present invention equipped with a prestressed coil spring.
Figure 2:
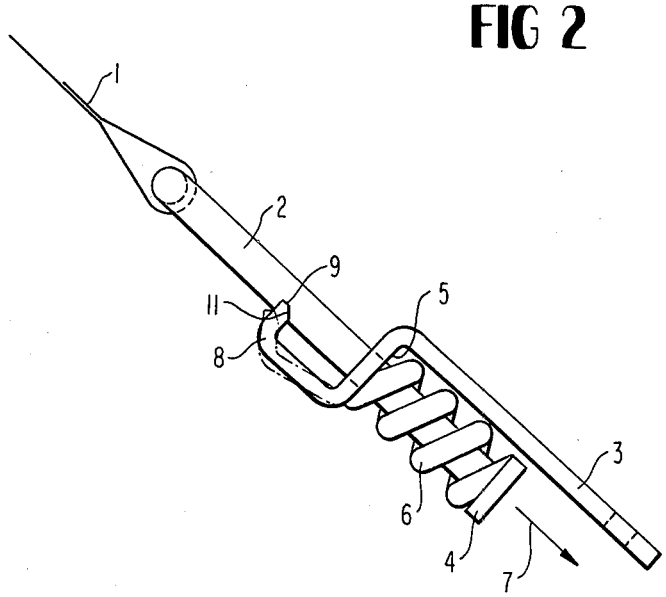
FIG. 2 is a side elevational view of the anchoring arrangement of FIG. 1.

Referring now to the drawing wherein like reference numerals are used throughout the various views to designate like parts, in the embodiment illustrated in FIGS. 1 and 2 of the drawing, the belt band 1 is secured at an eye 2 which is displaceably guided in a fitting 3 fixed at the vehicle. A coil spring 6 is arranged between a spring plate 4 of the eye 2 and a support surface 5 of the fitting 3, which spring is prestressed in the direction of the arrow 7 (FIG. 2). This coil spring 6 is blocked in the normal driving operation in its illustrated position by a bent-off free end 8 of the fitting 3 which engages into a recess 9 of the eye 2. If now a force is exerted for a short period of time by way of the belt band 1 on the eye 2 in the direction of the arrow 10 (FIG. 1), which exceeds the force of the prestressed coil spring 6, then the free end 8 of the fitting 3 is bent into the position illustrated in dash and dotted lines in FIG. 2, whereby the connection between the eye 2 and the fitting 3 is released and the spring 6 is able to unstress in the direction of the arrow 7 (FIG. 2). This release operation is assisted by the bevelled surfaces 11 at the free end 8 and at the eye 2.

Figure 3:
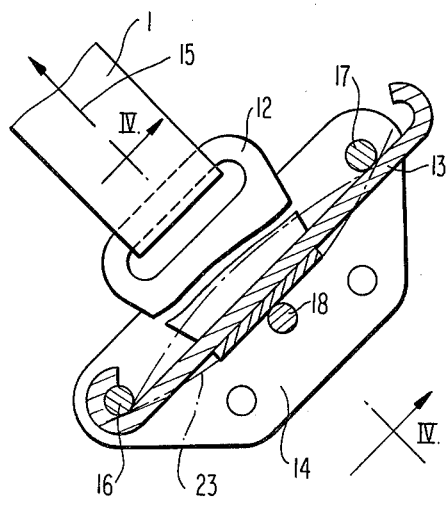
FIG. 3 is a plan view, partly in cross section, on a modified embodiment of an anchoring arrangement in accordance with the present invention which is provided with a prestressed leaf spring supported at three points.
Figure 4:
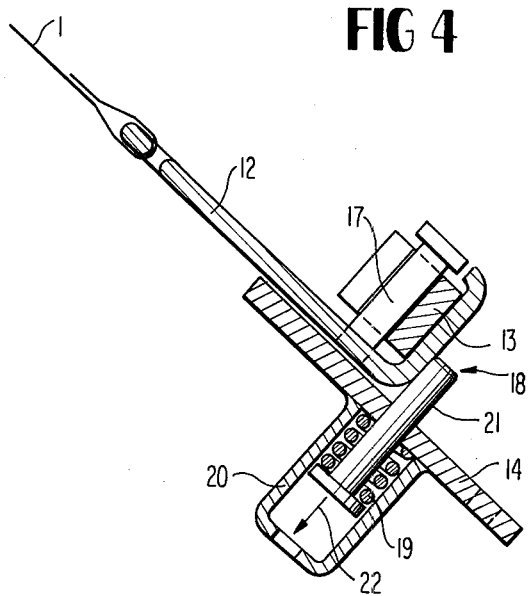
FIG. 4 is a cross-sectional view taken along line IV—IV in FIG. 3.

In the embodiment illustrated in FIGS. 3 and 4 of the drawing, the belt band 1 is connected with an eye 12 which surrounds a leaf spring 13 which in its turn is supported at a fitting 14 fixed at the vehicle in the tensional direction of the belt band 1 indicated in FIG. 3 by arrow 15 in two points 16 and 17. A bolt 21 stressed by a compression spring 19 and guided in a cylinder 20 is provided as third support point generally designated by reference numeral 18 on the side of the leaf spring 13 opposite the two first-mentioned support points 16 and 17; the bolt 21 is retained by frictional engagement in the normal driving operation at the bottom side of the area of the eye 12 surrounding the leaf spring 13. If a force exceeding the force of the prestressed leaf spring 13 is exerted on the eye 12 in the direction of arrow 15 (FIG. 3) by way of the belt band 1, the frictional engagement between the bolt 21 and the eye 12 is released and the bolt 21 is displaced by the force of the compression spring 19 in the direction of the arrow 22 (FIG. 4), whereby the leaf spring 13 assumes the lower dash and dotted position 23 indicated in FIG. 3 and therewith tightens the belt band 1.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An anchoring arrangement of an end or deflection point of a safety belt, at a fixed structural part fixed relative to the vehicle under interconnection of a spring means, characterized in that the spring means is installed prestressed in the sense of a tightening of the belt band and is blocked in the prestressed position during normal driving operation, and in that the blocking is released by a force peak with occurs at the beginning of an accident at the belt band and exceeds the prestress force of the spring means, characterized in that an eye means cooperating with the belt band is displaceably guided in a fitting means fixed relative to the vehicle, the fitting means having a bent-off free end which in normal operation blockingly engages in a recess of the eye means, and in that the spring means is supported both at the fitting means as also at the eye means.

2. An anchoring arrangement according to claim 1, characterized in that the spring means is directly supported at the fitting means and at the eye means.

3. An anchoring arrangement according to claim 1, characterized in that the spring means is indirectly supported at the fitting means and at the eye means.

4. An anchoring arrangement according to claim 1, characterized in that said spring means includes several cup springs.

5. An anchoring arrangement according to claim 1, characterized in that the spring means includes several coil springs.

6. An anchoring arrangement according to claim 1, 2, 3, 4, or 5, characterized in that the recess as also the free end of the fitting means engaging into the recess are provided with bevelled surfaces cooperating in the sense of a reduction of the release force.

7. An anchoring arrangement of an end or deflection point of a safety belt, at a fixed structural part fixed relative to the vehicle under interconnection of a spring means, characterized in that the spring means in installed prestressed in the sense of a tightening of the belt band and is blocked in the prestressed position during normal driving operation, and in that the blocking is released by a force peak which occurs at the beginning of an accident at the belt band and exceeds the prestress force of the spring means, characterized in that a spring means extending transversely to the tensional direction of the belt band is supported at a fitting means relative to the vehicle in the tensional direction in two points, in that an eye means cooperating with the belt band is operatively connected with the spring means between said support points, and in that on the side of the spring means opposite the two first-mentioned support points, a third support point is provided blocking the spring means in normal operation opposite the tensional direction of the belt band.

8. An anchoring arrangement according to claim 7, characterized in that the spring means is a rod spring.

9. An anchoring arrangement according to claim 7, characterized in that the spring means is a leaf spring.

10. An anchoring arrangement according to claim 7, characterized in that the third support point is located approximately centrally between the two first-mentioned support points.

11. An anchoring arrangement to claim 7, characterized in that the eye means is force-lockingly connected with the spring means.

12. An anchoring arrangement according to claim 7, characterized in that the eye means is form-lockingly connected with the spring means.

13. An anchoring arrangement according to claim 7, 8, 9, 10, 11 or 12, characterized in that the third support point includes a spring-loaded bolt means which in normal operation is retained by frictional engagement.

14. An anchoring arrangement according to claim 13, characterized in that the frictional engagement is with the spring means.

15. An anchoring arrangement according to claim 13, characterized in that the frictional engagement is with the eye means surrounding the spring means.

16. An anchoring arrangement of an end or deflection point of a safety belt, at a fixed structural part fixed relative to the vehicle under interconnection of a spring means, characterized in that the spring means is installed prestressed in the sense of a tightening of the belt band and is blocked in the prestressed position during normal driving operation, and in that the blocking is released by a force peak which occurs at the beginning of an accident at the belt band and exceeds the prestress force of the spring means, characterized in that the recess as also the free end of the fitting means engaging into the recess are provided with bevelled surfaces cooperating in the sense of a reduction of the release force.

17. An anchoring arrangement of an end- or deflection-point of a safety belt comprising:
    (a) a fitting fixedly mountable to the vehicle body;
    (b) a safety belt attachment member for receiving a safety belt and displaceably arranged relative to said fitting;
    (c) spring means interconnecting said fitting and attachment member;
    (d) releasable engagement means for retaining said attachment member in a normal driving position prestressing said spring means, said engagement means being disengageable upon applicantion of a force in excess of the prestressing of the spring means for enabling shifting of said attachment member from said normal driving position under prestress relieving movement of said spring means to thereby tighten said safety belt.

18. An anchoring arrangement according to claim 17, wherein said attachment member is an eye member through which said safety belt passes, and wherein said engagement means is a free end of said fitting engageable in a recess of said eye member.

19. An anchoring arrangement according to claim 17, wherein said attachment member is an eye member through which said safety belt passes, and wherein said engagement means is a displaceable member frictionally engageable at a bottom of said eye member.

* * * * *